United States Patent

Bogenberger et al.

[15] 3,702,378

[45] Nov. 7, 1972

[54] METHOD FOR TRANSMITTING TELEVISION-COMPATIBLE VIDEO AND AUDIO INFORMATION BY MEANS OF AUDIO FREQUENCY AND DEVICE FOR PRACTICING THE METHOD

[72] Inventors: Richard Bogenberger, Oberneuching; Heinz F. K. Busch, Riemerling; Walter Kroy, Munich; Walter E. Mehnert, Ottobrunn, all of Germany

[73] Assignee: Messerschmitt-Bolkow-Blohm GmbH

[22] Filed: April 20, 1970

[21] Appl. No.: 29,826

[30] Foreign Application Priority Data

April 28, 1969 Germany..........P 19 21 702.8

[52] U.S. Cl...........................178/5.8 R, 178/DIG. 3
[51] Int. Cl...............................................H04n 1/02
[58] Field of Search..................................178/5.6 R, 5.8 R; DIG 3, DIG 23; 179/2 TV

[56] References Cited

UNITED STATES PATENTS

| | | | |
|---|---|---|---|
| 3,384,710 | 5/1968 | Doundoulakis | 178/DIG. 3 |
| 3,021,384 | 2/1962 | Brown | 179/2 |
| 2,963,551 | 12/1960 | Schreiber | 178/5.8 |
| 3,095,653 | 7/1963 | Corrigan | 178/5.8 |
| 2,929,869 | 3/1960 | Hines et al. | 179/2 |
| 2,959,639 | 11/1960 | Pierce | 178/DIG. 3 |
| 3,061,670 | 10/1962 | Oster et al. | 179/2 |
| 2,878,310 | 3/1959 | Becker | 179/2 |
| 2,909,600 | 10/1959 | Becker | 179/2 |

*Primary Examiner*—Robert L. Griffin
*Assistant Examiner*—Peter M. Pecori
*Attorney*—Woodhams, Blanchard and Flynn

[57] ABSTRACT

A transmitter emits a high frequency carrier signal having relatively narrow modulation band of which the greater portion thereof is used for handling video information and the remainder is used for audio information. The video information is first stored in suitable storage tubes and is then retrieved and applied to the frame sweep controls of a conventional television receiver while simultaneously supplying to the audio portion thereof the audio signal above mentioned.

12 Claims, 2 Drawing Figures

PATENTED NOV 7 1972

3,702,378

Figures 1, 2:
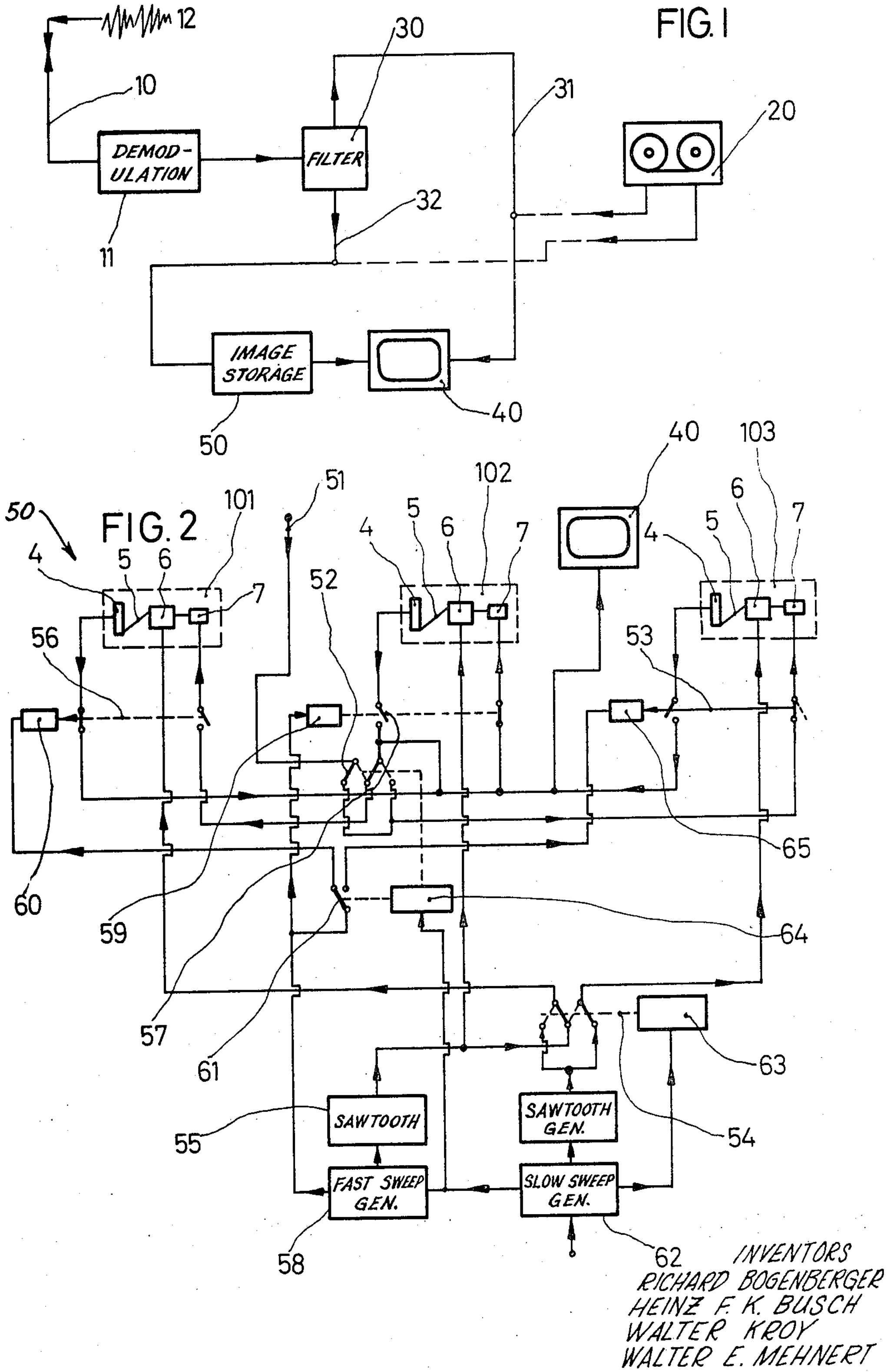

INVENTORS
RICHARD BOGENBERGER
HEINZ F. K. BUSCH
WALTER KROY
WALTER E. MEHNERT

BY Woodhams, Blanchard & Flynn
ATTORNEYS

METHOD FOR TRANSMITTING TELEVISION-COMPATIBLE VIDEO AND AUDIO INFORMATION BY MEANS OF AUDIO FREQUENCY AND DEVICE FOR PRACTICING THE METHOD

The invention relates to a method for television-compatible reproduction of video and audio information by means of audio frequency and to a device for practicing the method, in which still pictures, possibly together with simultaneous audio information, are transmitted on a frequency at the lower end of the LF band (about 30 kHz) so that the image and sound information can be reproduced by means of a commercial television set.

So far, a relatively wide channel (several MHz) has been required for the transmission of television images and sound, the associated transmitting and relay stations are relatively expensive and, in addition, because of the limited range of VHF and UHF, they must be present in large numbers to cover a specified area.

The object of the invention is to provide a system in which one tolerates a decrease in the amount of information transmitted per time unit (still pictures) but, instead, is able to utilize conventional high frequency transmitting systems. Because of the wide range of HF transmission (10 to 100 m wavelength) only a few transmitting stations are required to provide very wide coverage.

The object is attained by having the transmitter emit a high frequency carrier signal with a 30 kHz bandwidth of usable modulation. The greater portion, e.g., 26 kHz, is used in a known way fro the video information. The video information is stored temporarily by means of electronic storage tubes. The video information is stored in the receiver by means of a slow frame sweep unit and electronic switches in storage tubes and is retrieved by two tubes, respectively, and read out by means of a fast sweep generator to the television set.

To practice the method according to the invention, a television receiver is provided with the following: for image reproduction, an image storage unit consisting of three electrostatic switches for reading in, rereading and reading out the video signals plus fast and slow sweep generators. The normal audio channel is used for sound reproduction.

These features of the invention permit, in a simple way and at a great saving in time and effort, the transmission of still pictures with simultaneous audio information: High frequency transmitters can be used for transmission and the great effort required for normal wideband television transmission systems — establishment of a closely meshed, directional radio and relay station net-work — is considerably reduced, due to the long range of HF waves. In addition, the video and audio information can also be recorded and reproduced by means of a normal commercial tape recorder. The invention is particularly advantageous for training and instruction purposes.

The invention is described and drawn by means of one illustrative embodiment. The figures show:

FIG. 1 a block diagram of the receiving and reproducing unit according to the invention, FIG. 2 a block diagram of the image storage unit.

A HF carrier wave 12 (FIG. 1) with, for example, a usable modulation width of 30 kHz is received by means of an antenna 10 and a HF receiver having a demodulating stage 11. Following demodulation, it passes into a filter stage 30 and is divided into the video part 32 and the audio part 31. This information can be recorded by means of a commercial tape recorder 20 of, e.g., 30 kHz bandwidth or, in the normal case, can be transmitted to the reproduction unit 40 for immediate viewing. The audio part is fed directly into the television set 40, while the video information 32 is fed to an image storage unit 50 and from there, after having been processed in accordance with standards, is passed on to the television set 40 at a rate, e.g., of 20 pictures per second.

The input of the incoming video signal with a frequency of e.g., one image per second, is designated by 51 (FIG. 2). The switch 52, in the position drawn, switches on the storage tube 103. These tubes are essentially composed of one read-in system 7 with intensity control of the electron beam 5, a deflection system 6 and the storage plate 4, respectively. When the video signal enters the read-in system 7 of the tube 103 through the switches 52 and 53, the signal is recorded on the storage plate 4 of the tube 103. Immediately before the described video signal arrived, the previous image was recorded in the tube 101 through the switch 52 which was then in the position marked with dotted lines. While the new image is being read into tube 103, the previous image is read from tube 101, i.e., the non-modulated reading beam 5 is (quickly) deflected, due to a signal from the sawtooth generator 55 via the switch 54, by the deflection unit 6 of the tube 101, and read out from the storage plate 4 of the tube 101 with a line frequency of about 15 kHz which is required for a normal television set 40. This readout video signal arrives at the television set 40 through the switch 56. At the same time the signal after having passed through switch 57, reaches the read-in system 7 of tube 102, and is recorded on the plate 4 of the tube 102 by the deflection system 6 of the same tube 102. The line frequency is about 15 kHz, which is normal for television equipment. When the whole image has thus been re-read from tube 101 to tube 102, the fast sweep generator 58 provides a switching signal for both switch control 59 and switch control 60, said latter being at this time is connected to the fast sweep generator 58 through switch 61. This switching signal trips the switches 57 and 56 into the counter position. Thus the video signal is read out at standard speed from the storage plate 4 of tube 102 to the television set 40 and, at the same time, is transmitted again to the storage plate 4 of tube 101 through the switches 52 and 56. This interplay is continued for as long as the image is to remain on the screen.

Polling or reading of new read-in image from storage plate 4 of the tube 103 is initiated by a trigger pulse from the slow sweep generator 62. This pulse changes the position of the switches 52 and 61. Switch 54 is also changed, which changes the $x$ $y$ quick and $x$ $y$ slow deflection voltages at the storage tubes 102 and 103. The previously described interplay of storing images now continues between storing tubes 102 and 103. Due to the position of the switch 61, which was also changed, the image signal for the subsequent image is now again recorded slowly on storage plate 4 of tube 101. Switches 52, 53, 54, 56, 57 and 61 are electronic transfer switches, 52, 53, 54, 56 and 57 being twopole reversing switches. The switch control for switch 54 is designated by 63, while 64 is the one for the switch 61 and 65 the one for switch 53.

The embodiments of the invention in which an exclusive property or privilege is claimed are as follows:

1. A method of transmitting and receiving video and audio information for energizing a conventional television receiver, comprising the steps:
- modulating a carrier signal with a narrow band modulating signal of approximately audio frequency in which the greater portion of the bandwidth of said modulating signal is used for a video signal and the narrower portion is used for an audio signal;
- transmitting, receiving and demodulating said modulated carrier frequency signal to obtain said video signal;
- reading said video signal at a slow rate into one electronic storage tube for temporary storage while repetitively and at a fast rate passing back and forth between second and third storage tubes while synchronously applying to the television receiver a prior video signal previously received.

2. The method of claim 1, in which said carrier signal is a high frequency signal with a wavelength substantially within the range of 10–100 m and in which said modulating signal has a bandwidth of substantially 30 KHz, said greater portion being substantially 26 KHz and said narrower portion being substantially 4 KHz.

3. The method of claim 1 in which one said passing occurs for each time said prior video signal is supplied to said television receiver.

4. A method of transmitting and receiving video and audio information for energizing a conventional television receiver, comprising the steps:
- modulating a carrier signal with a narrow band modulating signal of approximately audio frequency in which the greater portion of the bandwidth of said modulating signal is used for a video signal and the narrower portion is used for an audio signal;
- transmitting, receiving and demodulating said modulated carrier frequency signal to obtain said video signal;
- reading said video signal at a slow rate into one electronic storage tube for temporary storage while repetitively and at a fast rate reading out of other storage tube means a prior video signal previously received and applying same to the television receiver, including reading the received video signals for successively transmitted pictures into two storage tubes alternately for temporary storage therein, and repetitively passing such stored video signal for one picture back and forth between one of said two storage tubes and a third storage tube at said fast rate while applying synchronously said stored signal to said television receiver and while a received video signal for another picture is read into the other of said two storage tubes.

5. Apparatus for transmitting and receiving video and audio information for feeding a conventional television receiver and wherein such information is contained in a narrow frequency bandwidth, said apparatus including a receiving unit comprising in combination:
- receiver means providing a video input signal containing said video information;
- an image storage unit comprising first, second and third storage tubes;
- input means for reading said input video signal at a slow rate into said first storage tube during a first interval and into said third storage tube during said second interval for storage;
- transfer means for passing said stored video signal repetitively and at a fast rate back and forth between said third and second storage tubes during said first interval and between said first and second storage tubes during said second interval and synchronously applying said stored video signal repetitively and at said fast rate to said television receiver as it is passed at said fast rate between said storage tubes.

6. The apparatus of claim 5 including a slow frame sweep unit, a fast frame sweep unit and first switch means alternatively coupling same to ones of said storage tubes, said input means including second switch means for applying said video input signal at a rate determined by said slow sweep unit to said first storage tube during said first interval and to said third storage tube during said second interval, said transfer means including third switch means for alternately reading out of said first and second storage tubes during said second interval a stored video signal from said first interval at a rate determined by said fast frame sweep unit and for alternately reading out of second and third storage tubes during said first interval a stored video signal from a prior second interval at a rate determined by said fast frame sweep unit, said transfer means further including means for applying, during said first and second intervals, said read out video signals to said television receiver.

7. The apparatus of claim 5, in which said input means comprises an input switch for alternately coupling said input video signal to said first and third storage tubes during said first and second intervals, respectively, said transfer means including first, second and third switch means for controlling video signal travel to and from said first, second and third storage tubes respectively, and including slow rate switch control means for applying slow rate switching signals to said input switch and during said first and second intervals to said first and third switch means respectively and fast rate switch control means for applying fast rate switching signals to said second and third switch means during said first interval and to said first and second switch means during said second interval, said fast rate substantially exceeding said slow rate, whereby said stored video signal is applied to said television receiver several times while said input video signal is being read into one of said first and third storage tubes, said stored video signal being regenerated each said time by transfer from one storage tube to another.

8. The apparatus of claim 5, in which said information is applied to said receiving unit in the form of a high frequency carrier signal approximately within the range of 10–100 m wavelength and modulated with a modulating signal of said narrow bandwidth, said narrow bandwidth being approximately 30 KHz, said video information occupying approximately 26 KHz of said bandwidth and said audio information occupying the remainder, said apparatus including demodulating means for removing said carrier frequency and means applying said audio information to said television set while said video information in the form of said input video signal is applied to said image storage unit.

9. The apparatus of claim 5, in which said storage tubes are electrostatic storage tubes and said television receiver operates at the conventional sweep frequency of about 15 KHz, said video input signal defining about one picture per second while said video output signal is fed to said television receiver at about 20 pictures per second.

10. The apparatus of claim 6, including means coordinating said second and third switch means for applying said input video signal to said first storage tube while the video output signal resulting from storage of a prior video input signal is read out of the third storage tube.

11. Apparatus for transmitting and receiving video and audio information for feeding a conventional television receiver and wherein such information is contained in a narrow frequency bandwidth, said apparatus including a receiving unit comprising in combination:

receiver means providing a video input signal containing said video information;

an image storage unit comprising storage tubes;

a slow frame sweep unit, a fast frame sweep unit and first switch means alternatively coupling same to ones of said storage tubes;

second switch means for applying said video input signal to a first one of said storage tubes at a rate determined by said slow sweep unit;

third switch means for simultaneously reading out of a second one of said storage tubes an input video signal resulting from prior storage of a previous video input signal previously applied to said second storage tube by said second switch means and at a rate determined by said fast frame sweep unit and applying same to said television receiver;

fourth switch means for applying said output video signal to a third one of said storage tubes as same is applied to said television receiver;

means coordinating said third and fourth switch means for sequentially passing said output video signal back and forth between said second and third storage tubes, said output video signal being applied to said television receiver alternately by said second and third storage tubes as same alternately read out into the other of said second and third storage tubes, means for subsequently applying the video signal in said first storage tube to said television receiver while a subsequent video input signal is applied to said second storage tube, whereby said video output signal produces a series of identical still pictures on said television receiver.

12. The apparatus of claim 11, including means for functionally interchanging said first and second storage tubes after said video input signal has completely read into said first storage means, for allowing a later video input signal to read into said second storage tube, whereby said television receiver displays a new series of identical still pictures for each functional interchange of said first and second storage tubes.

* * * * *